US012620309B2

(12) United States Patent
Scholich et al.

(10) Patent No.: US 12,620,309 B2

(45) Date of Patent: May 5, 2026

(54) SYSTEMS AND METHODS FOR CRASH DETECTION ON AUTONOMOUS VEHICLES

(71) Applicant: Torc Robotics, Inc., Blacksburg, VA (US)

(72) Inventors: Andre Scholich, Leipzig (DE); Biswanath Behera, Stuttgart (DE); Dimitrios Tzempetzis, Stuttgart (DE); Bernd Reinhold, Stuttgart (DE)

(73) Assignee: Torc Robotics, Inc., Blacksburg, VA (US)

( * ) Notice: Subject to any disclaimer, the term of this patent is extended or adjusted under 35 U.S.C. 154(b) by 25 days.

(21) Appl. No.: 18/750,563

(22) Filed: Jun. 21, 2024

(65) Prior Publication Data

US 2025/0391270 A1 Dec. 25, 2025

(51) Int. Cl.

| | |
|---|---|
| ***G08G 1/0968*** | (2006.01) |
| ***G08G 1/00*** | (2006.01) |
| ***G08G 1/01*** | (2006.01) |
| ***G08G 1/0967*** | (2006.01) |

(52) U.S. Cl.

CPC ..... *G08G 1/096844* (2013.01); *G08G 1/0112* (2013.01); *G08G 1/0133* (2013.01); *G08G 1/0141* (2013.01); *G08G 1/096725* (2013.01); *G08G 1/22* (2013.01)

(58) Field of Classification Search

CPC ........... G08G 1/096844; G08G 1/0112; G08G 1/0133; G08G 1/0141; G08G 1/096725; G08G 1/22

See application file for complete search history.

(56) References Cited

U.S. PATENT DOCUMENTS

| | | | | |
|---|---|---|---|---|
| 8,396,655 | B2 * | 3/2013 | Breuer | G07C 5/0891 701/48 |
| 9,646,428 | B1 * | 5/2017 | Konrardy | G06Q 10/0635 |
| 9,805,601 | B1 * | 10/2017 | Fields | G06F 18/214 |
| 10,134,278 | B1 * | 11/2018 | Konrardy | G08G 1/166 |
| 10,366,606 | B2 * | 7/2019 | Madigan | G08G 1/005 |
| 10,540,882 | B2 * | 1/2020 | Stenneth | G08B 25/006 |
| 10,853,882 | B1 * | 12/2020 | Leise | G06T 5/50 |
| 11,210,950 | B2 * | 12/2021 | Skipp | G08G 1/0112 |
| 11,341,847 | B1 * | 5/2022 | Beaurepaire | G08G 1/0133 |
| 11,441,916 | B1 * | 9/2022 | Konrardy | G01C 21/343 |

(Continued)

*Primary Examiner* — Courtney D Heinle

(74) *Attorney, Agent, or Firm* — Armstrong Teasdale LLP

(57) ABSTRACT

The present disclosure relates to an autonomous vehicle fleet routing system. The system includes a fleet of autonomous vehicles. Each autonomous vehicle includes an autonomy computing system. Additionally, a mission control computing system is provided, which communicates with each autonomous vehicle in the fleet. This mission control computing system includes a processor and a memory. The processor is configured to perform multiple functions including routing each autonomous vehicle to a designated destination. It also receives crash reports from the vehicles, which include location data related to crashes. Based on these reports, the system identifies which vehicles' routes are affected by the crash, calculates the operational losses for these routes, and generates alternative routes to minimize these losses. Commands are then transmitted to the affected vehicles to execute these alternative routes, enhancing fleet efficiency and reducing downtime caused by unforeseen incidents.

20 Claims, 8 Drawing Sheets

(56) References Cited

U.S. PATENT DOCUMENTS

| | | | | |
|---|---|---|---|---|
| 11,776,406 | B2 * | 10/2023 | Nielsen | G08G 1/0112<br>701/23 |
| 12,298,142 | B1 * | 5/2025 | Nash | G08G 1/096716 |
| 2018/0033300 | A1 * | 2/2018 | Hansen | G08G 1/096791 |
| 2018/0309592 | A1 * | 10/2018 | Stolfus | H04L 45/22 |
| 2019/0026886 | A1 * | 1/2019 | Ferguson | G06V 20/588 |
| 2020/0342241 | A1 * | 10/2020 | Tiziani | G06V 40/172 |
| 2020/0356100 | A1 * | 11/2020 | Nagarajan | G05D 1/247 |
| 2020/0372792 | A1 * | 11/2020 | Li | G06V 10/764 |
| 2021/0035442 | A1 * | 2/2021 | Baig | G08G 1/0116 |
| 2021/0191424 | A1 * | 6/2021 | Drayna | G05D 1/69 |
| 2021/0318695 | A1 * | 10/2021 | Cui | G08G 1/0112 |
| 2022/0244736 | A1 * | 8/2022 | Konrardy | G05D 1/617 |
| 2022/0355927 | A1 * | 11/2022 | Lavie | G08G 7/00 |
| 2022/0366336 | A1 * | 11/2022 | Khasis | G08G 1/04 |
| 2023/0204365 | A1 * | 6/2023 | Ishida | G06Q 50/40<br>701/422 |
| 2023/0365143 | A1 * | 11/2023 | Yumer | B60W 30/12 |
| 2024/0161621 | A1 * | 5/2024 | Mesrobian | G08G 1/0116 |
| 2025/0029488 | A1 * | 1/2025 | Zahid | G08G 1/096716 |
| 2025/0198791 | A1 * | 6/2025 | Kim | G01C 21/3691 |
| 2025/0225865 | A1 * | 7/2025 | Yang | G08G 1/0967 |

* cited by examiner

100

SYSTEMS AND METHODS FOR CRASH DETECTION ON AUTONOMOUS VEHICLES

TECHNICAL FIELD

The field of the disclosure relates generally to complex driving scenario responses for autonomous vehicles and, more specifically, detecting and handling crash situation on an autonomous vehicle to minimize the impact of the crash on a fleet of autonomous vehicles.

BACKGROUND OF THE INVENTION

Autonomous vehicles are commonly trained to detect objects and conditions within their operating environment to safely navigate. These vehicles rely on sophisticated systems to detect objects and conditions to enable them to navigate roads with a high degree of autonomy. These vehicles typically identify objects and respond to them based on information associated with the detected conditions. However, the scope of detection and the complexity of responses are limited. As driving scenarios become more complex, object detection becomes increasingly challenging for conventional autonomous vehicles. This limitation underscores the need for advanced system and methods to handle a broader range of more complex scenarios with greater precision and adaptability.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, the disclosed system for routing a plurality of autonomous vehicles in response to a crash is provided. The system includes a mission control including a computing system in communication with a fleet of autonomous vehicles. The mission control computing system includes a processor and a memory. The processor is programmed to: route each autonomous vehicle in the fleet to a destination, receive a crash report from an autonomy computing system on a first autonomous vehicle of the fleet of autonomous vehicles, identify the autonomous vehicles in the fleet affected by the crash on the route, compute an operational loss on the route for each of autonomous vehicles affected by the crash, generate an alternative route for each of the affected autonomous vehicles to reduce operational losses, and transmit a command to the affected autonomous vehicles to execute the alternative route. The crash report may include location data corresponding to the crash.

In another aspect, the disclosed autonomous vehicle fleet routing system is provided. The system includes a fleet of autonomous vehicles, each autonomous vehicle includes an autonomy computing system. The system also includes a mission control computing system in communication with each of the autonomous vehicles of the fleet. The mission control computing system includes a processor and a memory. The processor is programmed to: route each autonomous vehicle in the fleet to a destination, receive a crash report may include location data corresponding to a crash from the autonomy computing system on a first autonomous vehicle of the fleet of autonomous vehicles, identify which of the autonomous vehicles will be affected by the crash on their current route. compute an operational loss on the route for each of the identified autonomous vehicles, generate an alternative route for each of the identified autonomous vehicles to reduce operational losses, and transmit a command to the fleet of autonomous vehicles to execute the alternative route.

In yet another aspect, the disclosed method for routing a plurality of autonomous vehicles in response to a crash is provided. The method includes routing each autonomous vehicle in a fleet of autonomous vehicles to a destination; receiving a crash report may include location data corresponding to a crash from an autonomy computing system on a first autonomous vehicle of the fleet of autonomous vehicles, identifying which of the autonomous vehicles will be affected by the crash on their current route, computing an operational loss on the route for each of the identified autonomous vehicles, generating an alternative route for each of the identified autonomous vehicles to reduce operational losses, and transmitting a command to the fleet of autonomous vehicles to execute the alternative route.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
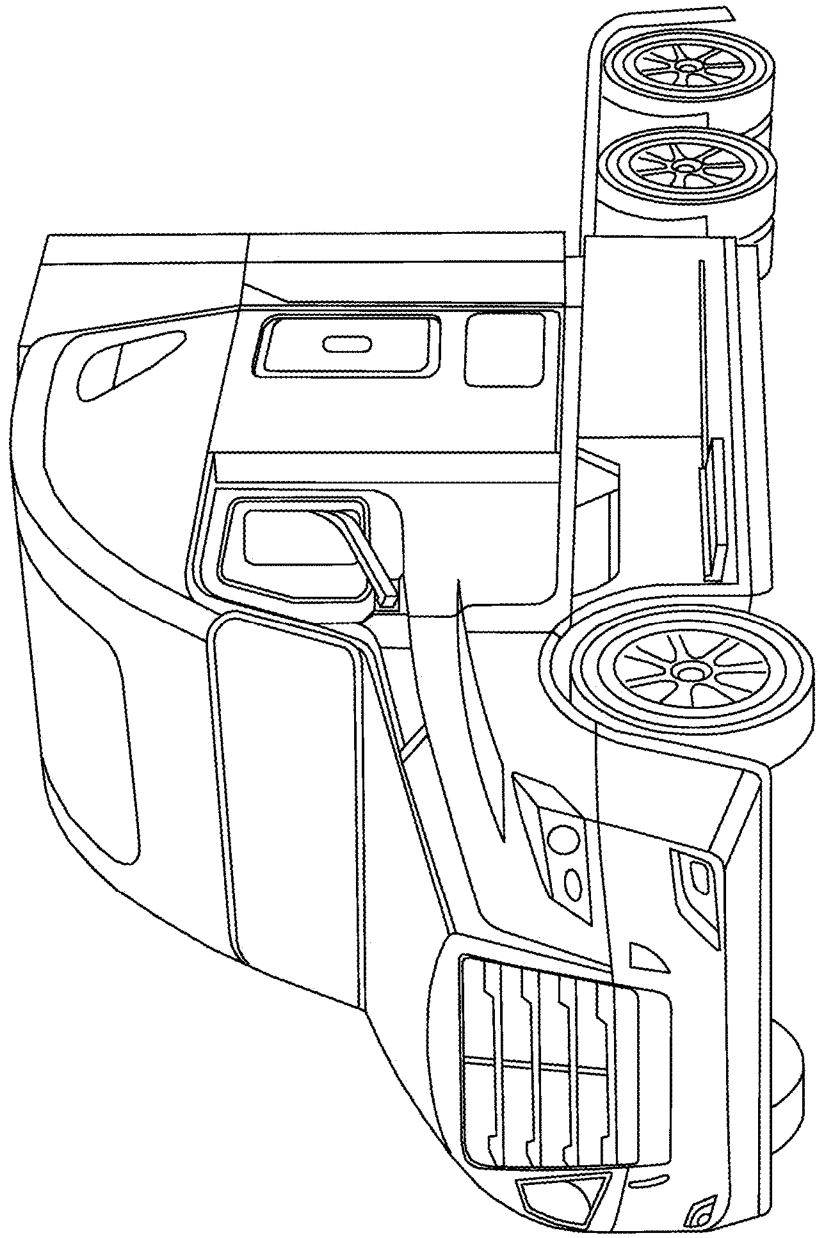
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The present disclosure is directed to autonomous vehicles and control thereof using sensor data collection and interpretation techniques to mitigate a crash. In various embodiments, the systems and methods for crash detection are applied to a fleet of autonomous vehicles in communication with a mission control. These techniques can facilitate, for example, crash detection (e.g. within the ego lane, concurrent lanes, and opposing lanes), executing a safe behavior to remediate the crash (e.g. decrease speed, engage alert lights, move to the shoulder), and transmitting an indication of the crash (e.g. notifying emergency services, rerouting a fleet of autonomous vehicles, and monitoring traffic conditions caused by the crash).

The autonomous vehicle includes various sensors and software modules for perceiving, for example, conditions on the road ahead. Conditions may include conventional traffic levels, road construction, road or lane closures, line or utility work, convoys, damaged or displaced infrastructure, or weather conditions such as snow or ice, among others. The autonomous truck continuously collects data from numerous sensors and processes and compiles that data into a model representing the environment, or "world," around the autonomous truck, i.e., a "world model." Additionally, the model is an input for further processing in the autonomous trucks autonomy computing system and, in particular, for example, detecting and mitigating a crash. In alternative embodiments, the sensor data is processed for crash detection independent of the world model.

The disclosed systems and methods include a processing system such as an autonomy computing system or another embedded computing system, such as an electronic control unit (ECU). The processing system includes at least one or more processors and one or more memory devices. The processing system receives sensor data from a plurality of sensors on the autonomous vehicle to detect the crash. For example, the processing system receives camera data from a camera disposed on the autonomous vehicle. Alternatively, the sensor is a LiDAR sensor and the processing system receives a point cloud generated by the LiDAR sensor. The processing system processes the received sensor data to detect the crash by, for example, detecting a condition associated with a crash (e.g. fire and/or smoke). In some embodiments, the processing system executes a machine learning algorithm to detect the crash. Additionally, the processing system executes object detection for a plurality of objects in the world model to detect the crash. The processing system computes the relative position, heading, and velocities of the objects to analyze interactions between objects in the world environment to detect a crash. For example, a sudden change in lateral velocity or computing zero distance between objects corresponds to the detection of a crash.

Upon detection of the crash, the autonomous vehicle processes the sensor data to identify a remedial action for safe navigation of the crash. The identified remedial action ensures safe behavior for the autonomous vehicle and the vehicles around the autonomous vehicle. For example, the remedial action includes reducing speed, lane biasing, stopping, engaging hazard signals, or moving to the shoulder. In some embodiments, the remedial action includes a minimum risk maneuver. As the autonomous vehicle navigates the crash, the autonomy computing system can reduce safety tolerance parameters to ensure safe navigation of the crash during the remedial action. The processing system then initiates the autonomous vehicle to execute the remedial action.

In various embodiments, the system generates a crash report corresponding to the crash. The crash report includes the sensor data corresponding to the crash. In some embodiments, the crash report includes an indication of the remedial action executed by the autonomous vehicle to navigate the crash. For example, the crash report includes a location of the crash and sensor data associated with the crash. Additionally, the crash report may include additional data such as the objects involved in the crash, the severity of the crash, and a picture or video feed of the crash.

The autonomous vehicle transmits the generated crash report to mission control. In some embodiments the crash report is also transmitted to emergency services. Mission control includes a processing system in communication with a fleet of autonomous vehicles. The processing system includes at least one or more processors and one or more memory. In various embodiments, mission control routes each of the autonomous vehicles in the fleet.

Mission control is also configured to receive additional crash reports. The additional crash reports include crash reports from additional autonomous vehicles in the fleet. For example, an autonomous vehicle driving on the other side of the road detects the crash and transmits the crash report to mission control. Further, the additional autonomous vehicles in the fleet can detect the crash on an additional road from the sensor data processed by the autonomy computing system. For example, the sensors of the autonomous vehicle can detect the crash from an outer road. Accordingly, the autonomous vehicles can detect the crash when the crash in within the environment of the autonomy computing system. In some embodiments, the crash report is received from the emergency service provider or other traffic reporting agencies. The mission control processes the additional crash reports to further analyze the crash. For example, the mission control processes the sensor data of the crash reports to associate the additional crash report to the detected crash. As the mission control receives additional data about the crash, the mission control can transmit an indication of the crash information to the fleet of autonomous vehicles.

In various embodiments, mission control processes the crash reports to identify the routes in the fleet affected by the crash. For each of the routes affected by the crash, mission control computes an operational loss caused by the crash. The computed operational loss is compared to alternate routes available to the affected autonomous vehicle. The alternate routes are generated by mission control. When mission control computes the operational loss caused by the crash to exceed the operational loss associated with the alternative route, mission control transmits a command to the affected autonomous vehicle to execute the alternative route. In some embodiments, the additional crash reports include an indication that the detected crash has been cleared. Mission control recomputes the routes affected by the crash and recomputes operational losses for the affected routes upon clearance of the crash. The alternative route can be modified to minimize operational losses upon clearance of the crash.

Figure 2:
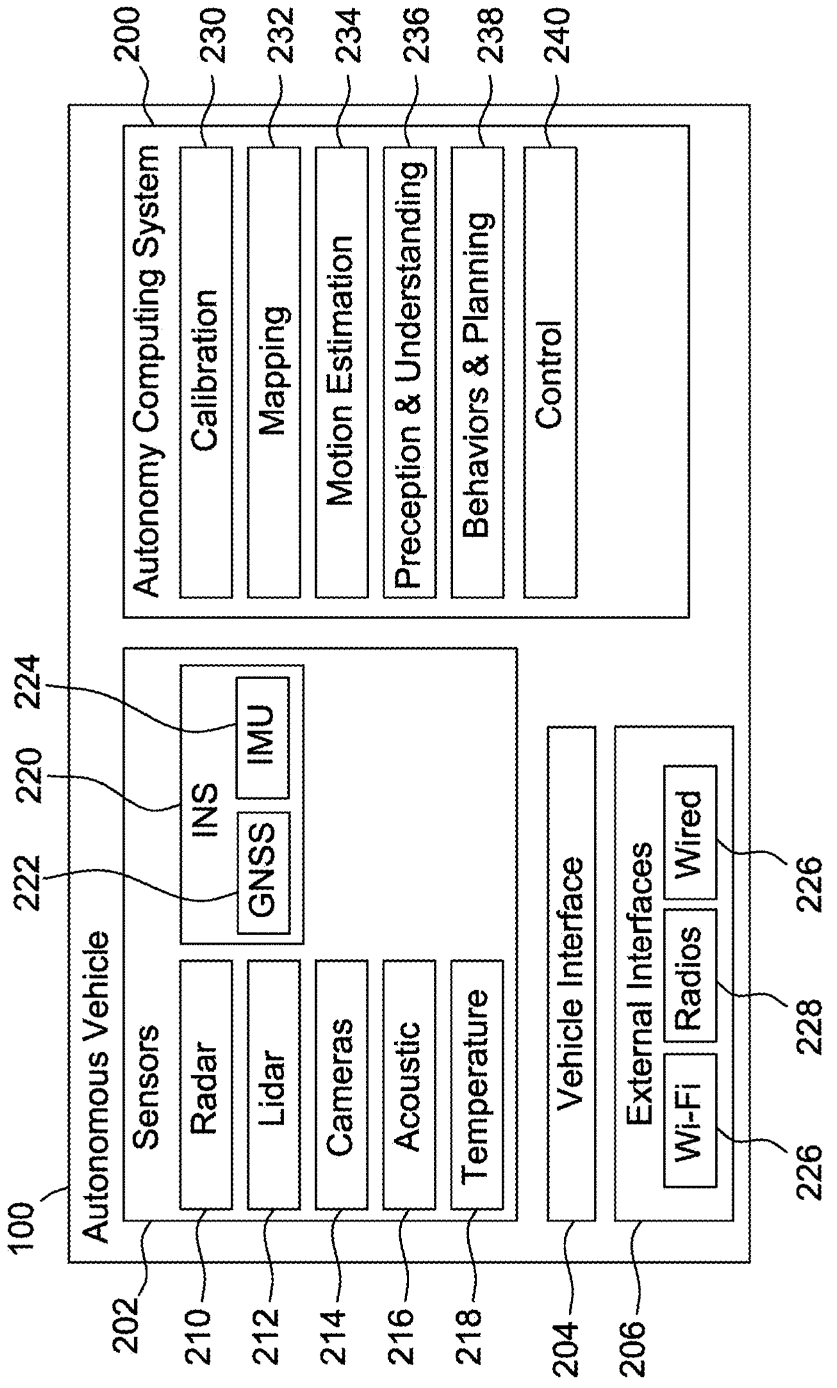
FIG. 2 is a block diagram of an autonomous vehicle.

FIG. 1 is a schematic diagram of an autonomous vehicle 100. FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 120 to determine how to control operation of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be stitched or combined to generate a visual representation of the multiple cameras' FOVs, which may be used to, for example, generate a bird's eye view of the environment surrounding autonomous vehicle 100. In some embodiments, the image data generated by cameras 214 may be sent to autonomy computing system 200 or other aspects of autonomous vehicle 100, and this image data may include autonomous vehicle 100 or a generated representation of autonomous vehicle 100. In some embodiments, one or more systems or components of autonomy computing system 200 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. Radar sensors 210 may include short-range RADAR (SRR), mid-range RADAR (MRR), long-range RADAR (LRR), or ground-penetrating RADAR (GPR). The sensor 202 is configured to collect sensor data within a sensor range. One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around autonomous vehicle 100.

GNSS receiver 222 is positioned on autonomous vehicle 100 and may be configured to determine a location of autonomous vehicle 100, which it may embody as GNSS data, as described herein. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, and or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5*g*, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, autonomous vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, and a control module or controller 240. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 3:
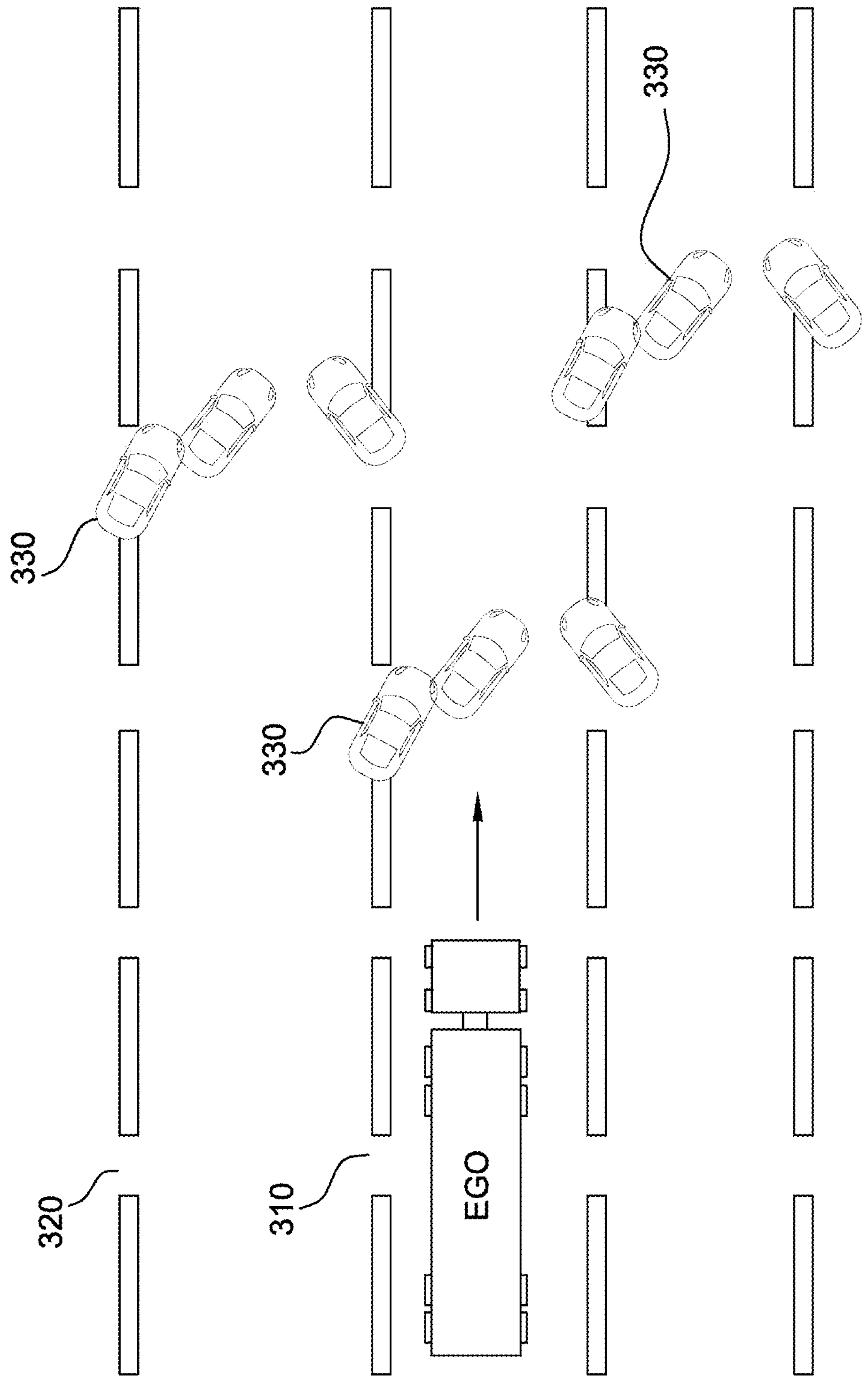
FIG. 3 is an illustration of an autonomous vehicle detecting a crash.

FIG. 3 is an illustration depicting an autonomous vehicle 310 detecting a crash 330 as autonomous vehicle 310 transits a road 320. For example, the autonomous vehicle 310 detects the crash 330 in the same lane (i.e., the ego lane) or another lane on the road (e.g. adjacent lane, oncoming lanes, on ramps, and off ramps). In various embodiments, sensors disposed on the capture data in the environment around the autonomous vehicle 310 for processing by the autonomy computing system, such as autonomy computing system 200 shown in FIG. 2, detect the crash within the operating environment of the autonomous vehicle 310. The autonomy computing system 200 processes the sensor data to detect a crash from the sensor data.

Figure 4:
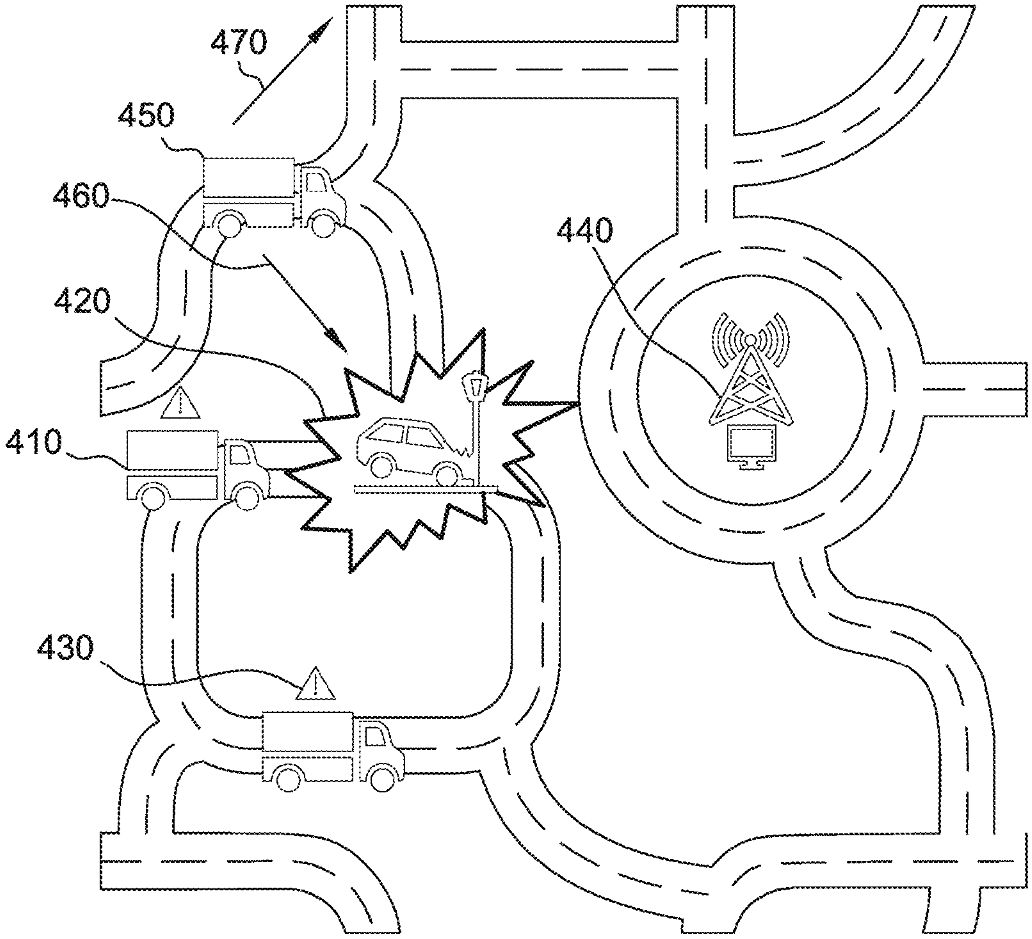
FIG. 4 is an illustration of a fleet of autonomous vehicles detecting and handling a crash.

FIG. 4 is an illustration of a fleet of autonomous vehicles detecting and handling a crash. The fleet of autonomous vehicles includes a plurality of autonomous vehicles, for example, a first autonomous vehicle 410, a second autonomous vehicle 430, and additional autonomous vehicles 450. The fleet of autonomous vehicles are connected to a mission control 440 to route the plurality of autonomous vehicles. In various embodiments, the first autonomous vehicle 410 detects a crash 420. The first autonomous vehicle 410 navigates the crash 420 by executing a remedial action. The first autonomous vehicle 410 generates a crash report for transmission to the mission control 440. The mission control 440 processes the crash report to identify the autonomous vehicles in the fleet affected by the crash 420. In some embodiments, the second autonomous vehicle 430 detects the crash from a road unaffected by the crash 420. The second autonomous vehicle 430 generates a crash report for transmission to the mission control 440. The mission control 440 computes an operational loss for the route of each of the vehicles affected by the crash 420. For example, the additional autonomous vehicles 450 may be transiting a route 460 when mission control 440 computes the operational loss to the route caused by the crash 420. The mission control 440 generates an alternative route 470 and transmits a command to the additional autonomous vehicle 450 to execute the alternative route 470.

In some embodiments a second autonomous vehicle 430 detects the crash 420. The second autonomous vehicle 430 may be travelling along a route unaffected by the crash. The second autonomous vehicle 430 generates a crash report. In various embodiments, the generated crash reports are transmitted to mission control 440. Mission control 440 processes the crash reports to determine the effect of the crash 420 on additional autonomous vehicles 450 in the fleet. For example, mission control 440 computes an operational loss on the route 460 caused by the crash 420. Mission control 440 generates an alternative route 470 for each of the additional autonomous vehicles 450 affected by the crash 420.

Figure 5:
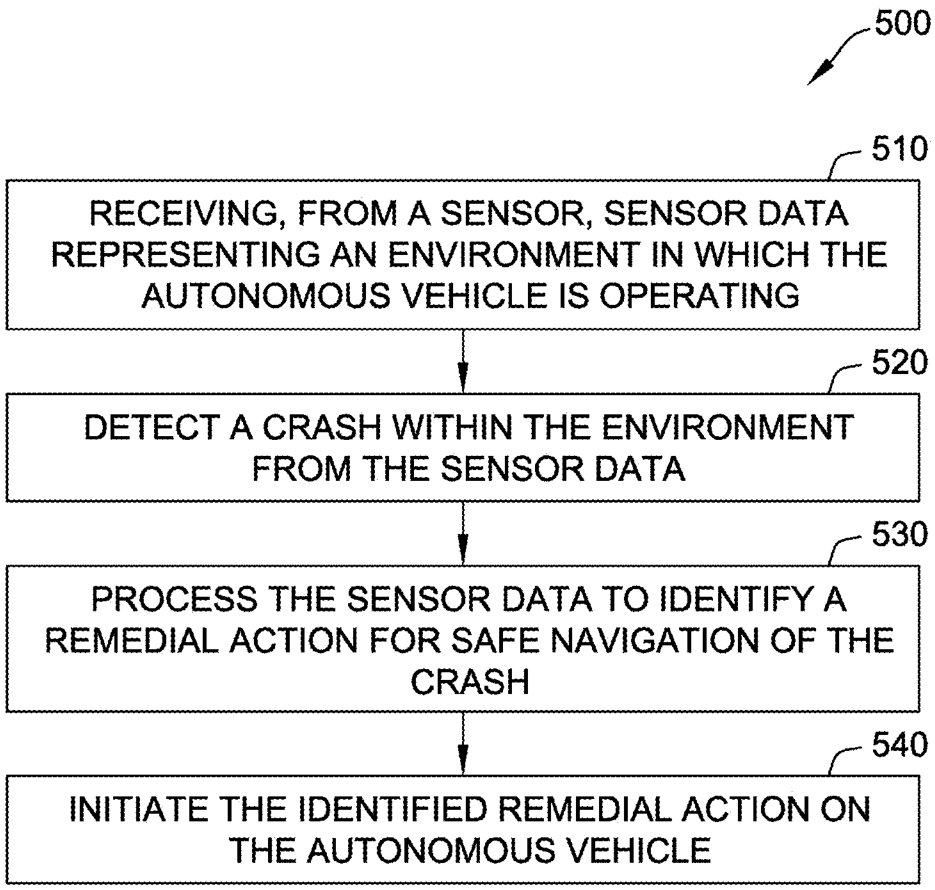
FIG. 5 is a flow diagram of an example method of crash detection and handling embodied in an autonomous vehicle.

FIG. 5 is a flow diagram of a method 500 of crash detection and handling on an autonomous vehicle. Method 500 may be implemented using autonomy system 200 (shown in FIG. 2) of autonomous vehicle 100 (shown in FIG. 1). In various embodiments, autonomous vehicle 100 receives 510 sensor data representing an environment in which the autonomous vehicle 100 is operating. The autonomous vehicle 100 detects 520 a crash within the environment of the autonomous vehicle 100. For example, the autonomy computing system 200 detects the crash from the sensor data. The autonomous vehicle 100 processes 530 the sensor data corresponding to the crash to identify a remedial action to safely navigate the crash. The autonomy computing system 200 then initiates 540 the autonomous vehicle 100 to execute the remedial action. Method 500 may include additional, fewer, or alternative steps.

In some embodiments, method 500 includes initiating a minimum risk maneuver as the remedial action. For example, the minimum risk maneuver (MRM) includes the autonomy computing system 200 computing an autonomous vehicle maneuver with the least amount of risk to ensure the safest remedial action is initiated upon detection of the crash. The MRM may include reducing speed of the autonomous vehicle 100 and parking it in a safe location, terminating the autonomous operation of the autonomous vehicle 100.

In various embodiments, method 500 also includes activating the hazard signals of the autonomous vehicle 100 in response to the detecting 520 the crash. The hazard signals include hazard signals on the autonomous vehicle 100 and any trailer connected to the autonomous vehicle 100. The hazard signals can be activated until the autonomous vehicle navigates through the crash to alert surrounding drivers of the crash situation. In some embodiments, the hazard signals can be deactivated upon navigation of the crash.

Figure 6:
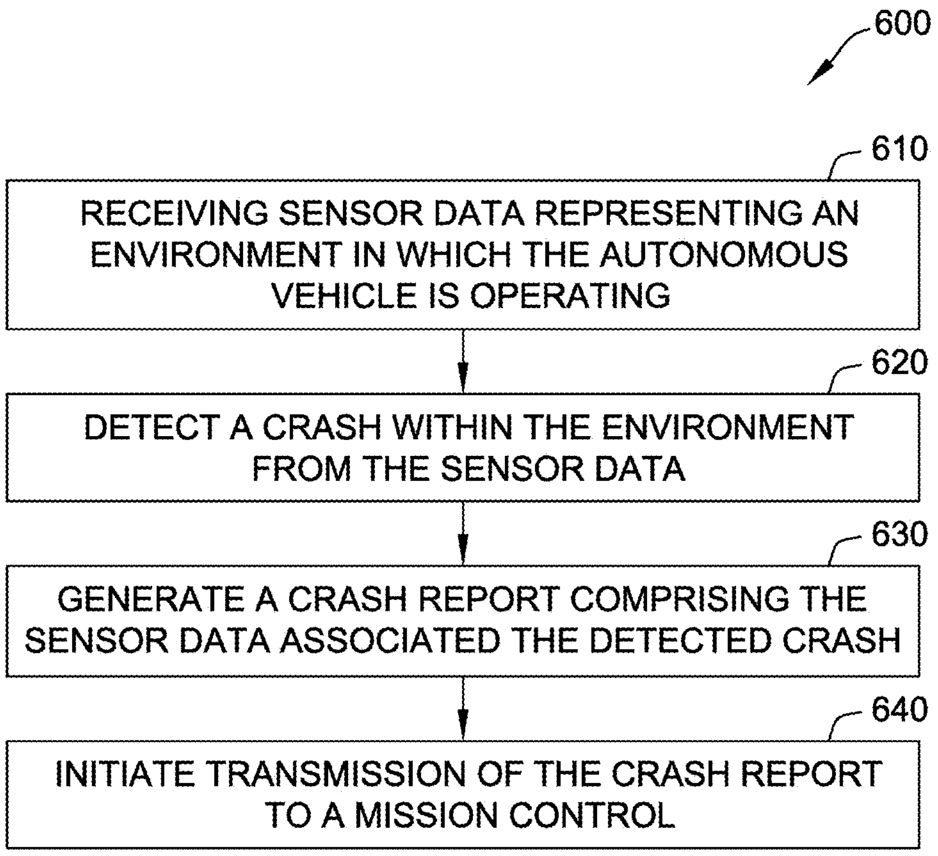
FIG. 6 is a flow diagram of an example method of crash detection on an autonomous vehicle and transmitting a crash report to mission control.

FIG. 6 is a flow diagram of an example method 600 of crash detection on an autonomous vehicle and transmitting an indication to mission control. Method 600 may be implemented using autonomy system 200 (shown in FIG. 2) of autonomous vehicle 100 (shown in FIG. 1) connected to a mission control 440 (shown in FIG. 4). Autonomous vehicle 100 receives 610 sensor data representing an environment in which the autonomous vehicle 100 is operating. The autonomous vehicle 100 detects 620 a crash within the environment of the autonomous vehicle 100 from the sensor data. The autonomy computing system 200 generates a crash report corresponding to the detected crash. In some embodiments, the crash report includes the sensor data corresponding to the crash, location data of the crash, and a remedial action executed by the autonomous vehicle 100.

The autonomy computing system 200 initiates 640 transmission of the crash report to a mission control. In some embodiments, the mission control receives an additional crash report from an additional autonomous vehicle in the fleet of autonomous vehicles. The mission control 710 processes the additional crash report to associate the additional crash report to the detected crash. For example, a first autonomous vehicle detects a crash and transmits the crash report to the mission control. A second autonomous vehicle then detects a crash from an oncoming road. Mission control 710 processes the first crash report and the additional crash report to associate them to the same crash. In some embodiments, the additional crash report indicates clearance of the crash. In various embodiments, the mission control transmits an indication of the crash to the connected fleet of autonomous vehicles. Method 600 may include additional, fewer, or alternative steps.

Figure 7:
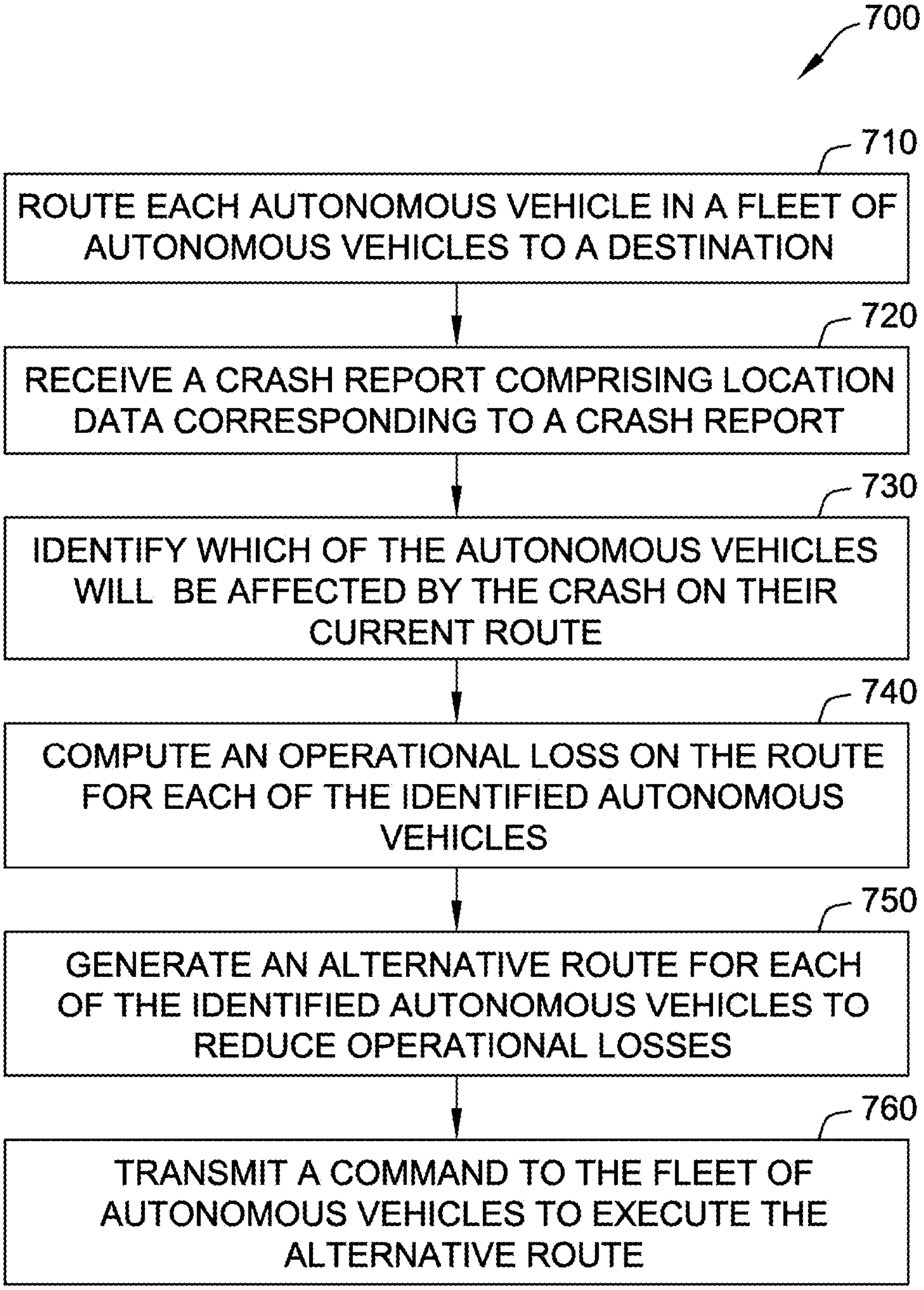
FIG. 7 is a flow diagram of an example method of crash detection and handling on a fleet of autonomous vehicles connected to a mission control.

FIG. 7 is a flow diagram of an example method of crash detection and handling on a fleet of autonomous vehicles connected to a mission control. Method 700 may be implemented using autonomy computing systems 200 (shown in FIG. 2) of a fleet of autonomous vehicles 100 (shown in FIG. 1) connected to a mission control 440 (shown in FIG. 4). In one embodiment, Mission control 440 routes 710 each of the autonomous vehicles 100 in the fleet. Mission control 440 receives 720 a crash report from a first autonomous vehicle 100 in the fleet. The crash report includes location data corresponding to the crash. Method 700 further includes identifying 730 which of the autonomous vehicles in the fleet will be affected by the crash on their current route. Mission control 440 computes 740 an operational loss on the route for each of the identified autonomous vehicles. The operational loss includes delays and other conditions affecting the route of the autonomous vehicle 100. In various embodiments, the mission control 440 transmits 760 a command to the fleet of autonomous vehicles 100 to execute the alternative route. Method 700 may include additional, fewer, or alternative steps.

In various embodiments, method 700 includes the mission control 440 receiving an indication from an autonomous vehicle 100 of a clearance of the crash. The autonomous vehicles 100 in the fleet that are affected by the clearance of the crash are identified by the mission control 440. The operational loss of the alternative route is recomputed by the mission control 440 for the identified autonomous vehicles 100. In some embodiments, the alternative route is modified to reduce operational losses upon the clearance of the crash. In various embodiments, a command is transmitted by the mission control 440 to the identified autonomous vehicles 100 to execute the modified route.

In some embodiments, method 700 includes the mission control 440 receiving an additional crash report from a second autonomous vehicle 430 or an additional autonomous vehicle 450 corresponding to the fleet of autonomous vehicles. In various embodiments, the additional autonomous vehicle 100 is in an oncoming roadway, side road, or other location where the sensors of the autonomous vehicle 100 can detect the crash with the sensors 202. In some embodiments, the additional crash report is used to compute the operational loss for each autonomous vehicle 100 in the fleet.

In some embodiments, method 700 further includes identifying emergency services corresponding to the location of the crash. For example, mission control 710 identifies police departments, fire departments, and emergency medical and rescue services based on the location of the crash. Mission control 710 then transmits an indication of the crash to the identified emergency services. The indication may include the crash report and location data of the detected crash.

Figure 8:
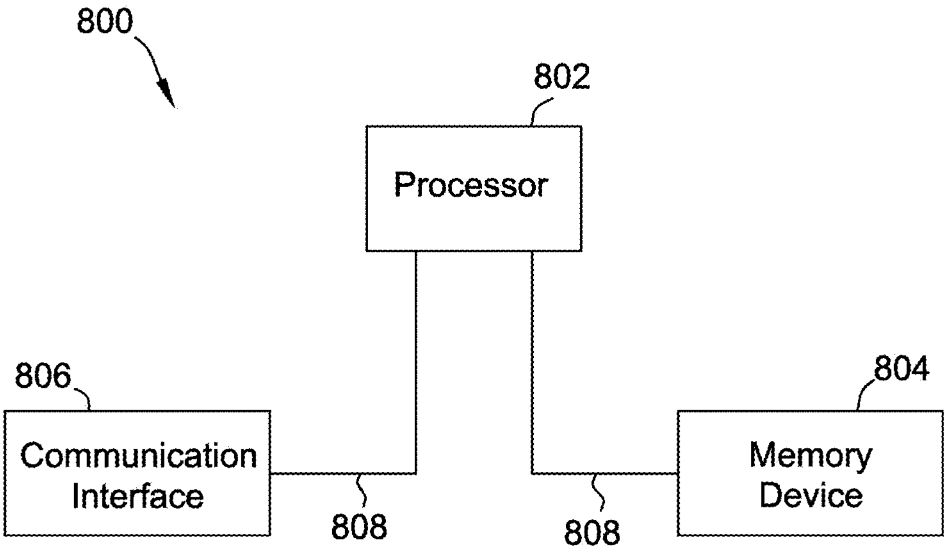
FIG. 8 is a block diagram of an example computing device.

FIG. 8 is a block diagram of an example computing device 800. Computing device 800 includes a processor 802 and a memory device 804. The processor 802 is coupled to the memory device 804 via a system bus 808. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device 804 includes one or more devices that enable information, such as executable instructions or other data (e.g., sensor data), to be stored and retrieved. Moreover, the memory device 804 includes one or more computer readable media, such as, without limitation, dynamic random access memory (DRAM), static random access memory (SRAM), a solid state disk, or a hard disk. In the example embodiment, the memory device 804 stores, without limitation, application source code, application object code, configuration data, additional input events, application states, assertion statements, validation results, or any other type of data. The computing device 800, in the example embodiment, may also include a communication interface 806 that is coupled to the processor 802 via system bus 808. Moreover, the communication interface 806 is communicatively coupled to data acquisition devices.

In the example embodiment, processor 802 may be programmed by encoding an operation using one or more executable instructions and providing the executable instructions in the memory device 804. In the example embodiment, the processor 802 is programmed to select a plurality of measurements that are received from data acquisition devices.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for routing a plurality of autonomous vehicles in response to a crash, the system comprising:
- a mission control computing system in communication with a fleet of autonomous vehicles, the mission control computing system comprising a processor and a memory, the processor programmed to:
  - route each autonomous vehicle in the fleet to a destination;
  - receive, from an autonomy computing system on a first autonomous vehicle of the fleet of autonomous vehicles, a crash report comprising location data corresponding to a crash, the location data including a location of the crash;
  - based on the location of the crash, identify which autonomous vehicles in the fleet are likely to be affected by the crash;
  - compute an operational loss on the route for each of the identified autonomous vehicles;
  - generate an alternative route for each of the identified autonomous vehicles to reduce operational losses; and
  - transmit a respective command to each of the identified autonomous vehicles to execute the alternative route.

2. The system of claim 1, wherein the processor is further programmed to receive an indication from a second autonomous vehicle of the fleet of a clearance of the crash.

3. The system of claim 2, wherein the processor is further programmed to:

identify the autonomous vehicles in the fleet affected by the clearance on the alternative route;

recompute operational losses of the alternative route in response to the clearance;

modify the alternative route to reduce operational losses; and transmit a command to the identified autonomous vehicles to execute the modified alternative route.

4. The system of claim 1, wherein the processor is further programmed to receive an additional crash report from an additional autonomous vehicle.

5. The system of claim 4, wherein the processor is further programmed to process the additional crash report to compute the operational loss.

6. The system of claim 1, wherein the processor is further programmed to:

identify emergency services corresponding to the location data of the crash report; and initiate transmission of an indication of the crash to the identified emergency services.

7. The system of claim 1, wherein the processor is further programmed to monitor the first autonomous vehicle for execution of a remedial action.

8. An autonomous vehicle fleet routing system comprising:

a fleet of autonomous vehicles, each autonomous vehicle comprising an autonomy computing system; and a mission control computing system in communication with each of the autonomous vehicles of the fleet, the mission control computing system including a processor and a memory, the processor programmed to:

route each autonomous vehicle in the fleet to a destination;

receive, from the autonomy computing system on a first autonomous vehicle of the fleet of autonomous vehicles, a crash report comprising location data corresponding to a crash, the location data including a location of the crash;

based on the location of the crash, identify which of the autonomous vehicles are likely to be affected by the crash;

compute an operational loss on the route for each of the identified autonomous vehicles;

generate an alternative route for each of the identified autonomous vehicles to reduce operational losses; and transmit a respective command to each of the identified autonomous vehicles to execute the alternative route.

9. The autonomous vehicle fleet routing system of claim 8, wherein the processor is further programmed to receive an indication from the autonomous vehicle of a clearance of the crash.

10. The autonomous vehicle fleet routing system of claim 9, wherein the processor is further programmed to:

identify the autonomous vehicles in the fleet affected by the clearance of the crash on the alternative route;

recompute operational losses of the alternative route in response to the clearance of the crash;

modify the alternative route to reduce operational losses; and transmit a command to the identified autonomous vehicles to execute the modified alternative route.

11. The autonomous vehicle fleet routing system of claim 8, wherein the processor is further programmed to receive an additional crash report from an additional autonomous vehicle.

12. The autonomous vehicle fleet routing system of claim 11, wherein the mission control computing system is further programmed to process the additional crash report to compute the operational loss.

13. The autonomous vehicle fleet routing system of claim 8, wherein the processor is further programmed to;

identify emergency services corresponding to the location data of the crash report; and transmit an indication of the crash to the emergency services.

14. The autonomous vehicle fleet routing system of claim 8, further comprising monitoring the first autonomous vehicle for execution of a remedial action.

15. A computer-implemented method for routing a plurality of autonomous vehicles in response to a crash, the method implemented by a mission control computing system including a processor and a memory, the method comprising:

routing each autonomous vehicle in a fleet of autonomous vehicles to a destination;

receiving, from an autonomy system on a first autonomous vehicle of the fleet of autonomous vehicles, a crash report comprising location data corresponding to a crash event, the location data including a location of the crash;

identifying which autonomous vehicles are likely to be affected by the crash based on the location of the crash;

computing an operational loss on the route for each of the identified autonomous vehicles;

generating an alternative route for each of the identified autonomous vehicles to reduce operational losses; and transmitting a respective command to each of the autonomous vehicles to execute the alternative route.

16. The computer-implemented method of claim 15, further comprising receiving an indication from a second autonomous vehicle of the fleet of a clearance of the crash.

17. The computer-implemented method of claim 16, further comprising:

identifying the autonomous vehicles in the fleet affected by the clearance of the crash on the alternative route;

recomputing operational losses of the alternative route in response to the clearance of the crash;

modifying the alternative route to reduce operational losses; and transmitting a command to the identified autonomous vehicles to execute the modified alternative route.

18. The computer-implemented method of claim 15, further comprising receiving and additional crash report from an additional autonomous vehicle.

19. The computer-implemented method of claim 18, further comprising processing the additional crash report to compute the operational loss.

20. The computer-implemented method of claim 15, further comprising:

identifying emergency services corresponding to the location data of the crash report; and transmitting an indication of the crash to the emergency services.

* * * * *